United States Patent [19]
Jacobs

[11] Patent Number: 6,047,358
[45] Date of Patent: Apr. 4, 2000

[54] COMPUTER SYSTEM, CACHE MEMORY AND PROCESS FOR CACHE ENTRY REPLACEMENT WITH SELECTIVE LOCKING OF ELEMENTS IN DIFFERENT WAYS AND GROUPS

[75] Inventor: Eino Jacobs, Belmont, Calif.

[73] Assignee: Philips Electronics North America Corporation, New York, N.Y.

[21] Appl. No.: 08/961,965

[22] Filed: Oct. 31, 1997

[51] Int. Cl.[7] ...................................... G06F 13/00
[52] U.S. Cl. .......................... 711/133; 711/128; 711/134; 711/136
[58] Field of Search ................... 711/133, 136, 711/159, 160, 128, 134, 135

[56] References Cited

U.S. PATENT DOCUMENTS

| | | | |
|---|---|---|---|
| 4,513,367 | 4/1985 | Chan et al. | 711/145 |
| 4,977,498 | 12/1990 | Rastegar et al. | 711/128 |
| 5,185,878 | 2/1993 | Baror et al. | 711/123 |
| 5,353,425 | 10/1994 | Malamy et al. | 711/144 |
| 5,493,667 | 2/1996 | Huck et al. | 711/128 |
| 5,515,519 | 5/1996 | Yoshioka et al. | 712/234 |
| 5,537,574 | 7/1996 | Elko et al. | 711/141 |
| 5,584,014 | 12/1996 | Nayfeh et al. | 711/134 |
| 5,694,567 | 12/1997 | Bourekas et al. | 711/3 |
| 5,737,752 | 4/1998 | Hilditch | 711/133 |
| 5,875,465 | 2/1999 | Kilpatrick et al. | 711/134 |
| 5,913,224 | 6/1999 | MacDonald | 711/125 |

FOREIGN PATENT DOCUMENTS

| | | |
|---|---|---|
| 0568221 | 11/1993 | European Pat. Off. . |
| 0598570 | 5/1994 | European Pat. Off. . |

OTHER PUBLICATIONS

"Cache Memories" by Alan Jay Smith, University of California, Berkeley, California 94720, Comparing Surveys, vol. 14, No. 3, Sep. 1982, pp. 473–530.

*Primary Examiner*—Glenn Gossage
*Attorney, Agent, or Firm*—Tony E. Piotrowski; Daniel J. Piotrowski

[57] ABSTRACT

A computer system, a cache memory and a process, each enabling a cache replacement policy with locking. The computer system comprises a processing device and a memory system, the memory system including a higher level memory, a cache memory and lock ordering resources. The higher level memory provides for storage of information and the cache memory duplicates certain of that information in cache blocks, the cache memory comprising elements organized in sets and ways, wherein each cache block can reside in any element of a set to which the cache block is assigned, and includes a replacement policy. The lock ordering resources is capable of utilizing a granularity of less than an entire way and a selected contiguity of element locking proceeding through selected ways, element-by-element, in a selected order starting from a selected beginning element of one of the selected ways. The lock ordering resources may include a sequencer, a cache control, a first storage device for storing an address of a first cache block to be locked, and a second storage device storing the number of elements for locking. The lock ordering resources may also include a lock vector administrator and a least recently used (LRU) administrator. Cache blocks having addresses in a lock range may be loaded into elements of the selected ways.

31 Claims, 5 Drawing Sheets

COMPUTER SYSTEM, CACHE MEMORY AND PROCESS FOR CACHE ENTRY REPLACEMENT WITH SELECTIVE LOCKING OF ELEMENTS IN DIFFERENT WAYS AND GROUPS

BACKGROUND OF THE INVENTION

This invention relates to systems, apparatuses and methods employing and implementing cache memories. More specifically, this invention relates to systems, apparatuses and methods employing and implementing set-associative cache memories having replacement policies that support locking.

Cache memories generally comprise part of a memory system; the memory system in turn typically comprises part of a computing system, such as a personal computer or a television (TV) set-top box. The computing system further comprises a processing device. In the computing system, the memory system stores information which the processing device accesses in read and write operations. When accessing information, the processing device typically requires the information to be available on an essentially immediate basis. If the information is delayed, the processing device's operation can stop (a "stall"). Stalls range, in the user's experience, from unnoticeable to quite noticeable degradations of the computing system's performance. Moreover, a stall can cause the computing system to fail, such as where the processing device's unstalled performance is the foundation of a running application. Accordingly, the computing system's proper operation is a function not only of the processing device's performance, but also of the memory system's performance.

Ideal memory systems satisfy three properties: infinite speed, infinite capacity and low cost. Memory systems should be infinitely fast so that, for example, the processing device's operation is unhindered by information availability. Memory systems should be infinitely capacious so that, for example, they can-provide any and all information that the processing device may need in its operations associated with applications. Memory systems should be inexpensive, for example, so as to minimize their cost penalty respecting the computing device.

As a general principle, however, no single memory technology can satisfy, at once, each of these properties. Rather, memory technologies typically can satisfy any two of these properties, while violating the remaining property. Responding to this constraint, memory systems generally are structured as a hierarchy. Hierarchical memory systems combine technologies, generally in physically distinct levels, so as to balance among speed, capacity and expense at each level and toward achieving, overall, both acceptable performance and economy.

At the lowest level of a hierarchical memory system typically are the registers of the system's processing device. These registers are limited in number, are extremely fast and are disposed physically adjacent to the logic blocks of the processing device (e.g., the arithmetic logic unit). However, their location makes the registers expensive relative to other memory technologies.

In the hierarchy's next higher level is the cache memory. The cache memory may itself occupy levels, including a first level that is resident as part of the processing device's integrated circuit ("on-chip"), and a second level that is not on-chip but may be inside the processing device's package or otherwise closely coupled to such device.

Also in the hierarchy are other, increasingly higher levels of memory. These levels typically include (i) a main memory, generally comprising volatile memory technology (e.g., random access memory in any of its forms) and (ii) more-permanent storage (e.g., compact disk, floppy, hard, and tape drives).

The cache memory generally is implemented, relative to higher levels of memory, using fast technologies. These technologies tend to be relatively expensive on a per-bit basis. However, because the cache memory typically is small in capacity, its overall cost remains acceptable in the computing system.

The cache memory's fast operation typically is buttressed by physically-close coupling to the processing device. In keeping with its speed and coupling, the cache memory generally is implemented so as to hold the information that the processing device is deemed most likely to access in the immediate future. In that regard, the processing device will first seek access to particular information via the cache memory because, if the information (e.g., data, instructions, or both) is found in the cache memory (a cache "hit"), the information can be provided at great speed to the device. If the information is not found in the cache memory (a cache "miss"), the processing device accesses the information via one of the next, higher levels of the memory system. These next-level accesses typical engender, relative to a hit, increasingly larger delays in the information's availability (the "miss penalty") to the processing device. Moreover, these next-level accesses also typically trigger an update of the cache memory's contents, generally by duplicating or copying information from the main memory into the cache memory. Both cache misses and the attendant updating procedures tend to stall the processing device.

Accordingly, cache memory is engineered in the computing system, typically via a combination of hardware and software, not only to store duplicate copies of information, but also to continually manage the cache memory's contents, all so that cache misses and attendant updates are minimized. To do so, cache memories typically exploit the principle of locality of reference. This principle holds that certain information has a higher probability of being accessed in the immediate future than other information. This principle has two component properties: spatial locality and temporal locality. Spatial locality holds that accessing information having a specific memory address makes probable a near-term access of information in neighboring memory addresses. Accordingly, spatial locality is generally used to determine the scope of information that is brought into the cache. In an update, for example, spatial locality directs duplicating in the cache memory both accessed and neighboring information.

Temporal locality holds that an access to certain information makes probable a near-term re-access to that information. Temporal locality generally is used to determine a replacement policy, i.e. to determine what, if any, information is replaced in a cache update. For example, a miss generally triggers an update procedure that will replace information corresponding, in size, to the amount of information being stored in the update. One replacement policy is to replace information which, as of the update, was the least recently used: such information being deemed the least likely to be used in the near-term and, therefore, replaceable.

Although it comports with the principle of locality, the Lease Recently Used (LRU) replacement policy's unfettered operation may be undesirable. For example, certain information may not be recently used, but nevertheless should be retained in the cache memory because it is deemed critical to the processing device's operation and/or the proper overall function of the computing system.

One approach to retaining critical information is known as cache locking. Cache locking arrangements have been proposed, but generally have shortcomings. For example, the arrangements tend to lock the cache memory in fixed, undesirably large increments (e.g., large "granularity"). Large-granularity locking arrangements are undesirable because they tend to retain information in the cache memory that is neither critical nor satisfying of the principal of locality. Retaining that information wastes the cache memory's capacity. This waste effectively reduces the size of the cache memory which reduction, in turn, generally degrades the performance of the cache memory (a cache memory's hit frequency tends to decrease as the cache memory size decreases).

In addition, proposed locking arrangements tend to use replacement policies that do not comport with the principle of locality. Using such replacement policies tends to degrade the performance of the cache memory. For example, such replacement policies tend to increase the probability for replacement of unlocked, active information, particularly as the amount of locked information increases. Replacement of active information tends to increase the frequency of cache misses.

Accordingly, it is desirable to provide cache locking that precludes replacement of critical, inactive information while also providing a replacement policy that comports with the principle of locality. It is also desirable to enable locking of critical information in a cache memory using an optimally-sized granularity while also enforcing the principle of locality in the replacement policy applicable to unlocked information.

SUMMARY OF THE INVENTION

A general object of this invention is to overcome the limitations associated with conventional memory systems, particularly the cache memories thereof. Another general object of this invention is to enable locking of critical information in a cache memory while also enforcing the principle of locality in the replacement policy applicable to unlocked information.

In accordance with these and other objects, the invention comprises, in one aspect, a computing system, the computing system comprising a processing device and a memory system, the memory system including a higher level memory, a cache memory and lock ordering resources. The higher level memory provides for storage of information and the cache memory duplicates certain of that information in cache blocks, the cache memory comprising elements organized in sets and ways and supporting a replacement policy. The lock ordering resources support a granularity of less than an entire way and a selected contiguity of element locking proceeding through selected ways, element-by-element, in a selected order starting from a selected beginning element of one of the selected ways.

In another aspect, the invention comprises a cache memory having lock ordering resources.

In yet another aspect, the invention comprises a process including the steps of establishing a granularity of less than an entire way, selecting a beginning element for locking, selecting ways available for locking, and selecting a contiguity of element locking proceeding through the selected ways, element-by-element, in a selected order starting from the selected beginning element of one of the selected ways.

The various features of novelty which characterize the invention are pointed out with particularity in the claims annexed to and forming a part of this specification. For a better understanding of the invention, its operating advantages and specific objects attained by its use, reference should be made to the accompanying drawings and descriptive matter in which its preferred embodiments are illustrated and described, wherein like reference numerals identify the same or similar elements.

DETAILED DESCRIPTION

Figure 1:
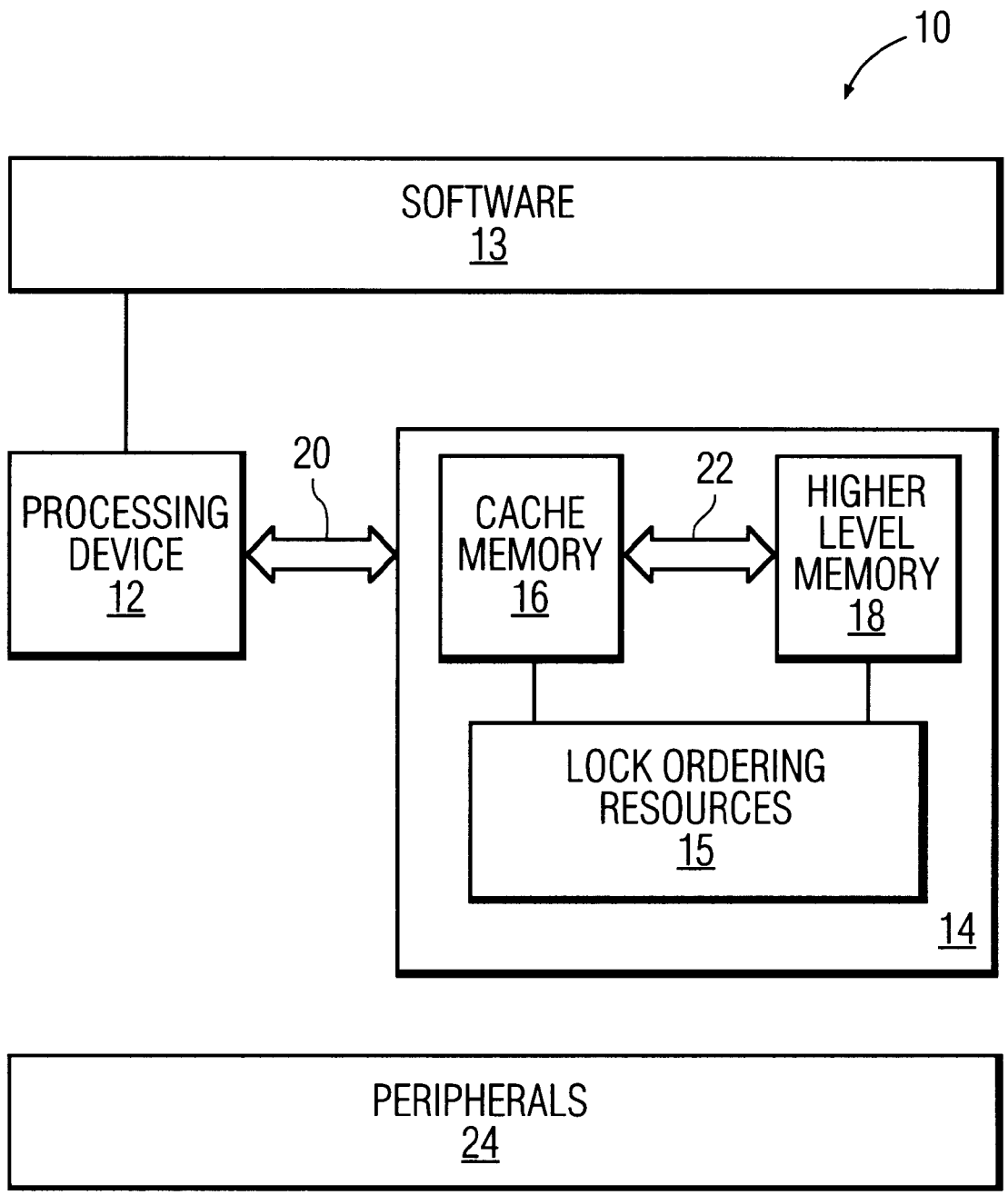
FIG. 1 illustrates a generalized computing system, according to the present invention.

The present invention enables locking of critical information in a set-associative cache memory while also providing a replacement policy that comports with the principle of locality, as applicable to unlocked information.

In the description that follows, nomenclature and other details are set forth toward providing a thorough understanding of the present invention. However, it should be understood by those of ordinary skill in the pertinent art that the certain details are not required in order to practice present invention. Moreover, well-known elements, devices, process steps and similar information may be omitted from the detailed description, such as by being shown in block diagram form, in order to avoid obscuring the present invention.

Further, it should be understood by those of ordinary skill in the pertinent art that the following detailed description is of certain embodiments of the present invention and is not intended to describe, and does not describe, all embodiments of the present invention. In that regard, as to such descriptions, it should be understood by those of ordinary skill in the pertinent art that one or more of any characteristics can be other than as described (or can be omitted entirely in some cases), without departing from the principles of the invention. As an example, the embodiments are described to employ a cache memory configured to contain only data. However, it should be understood that the invention embraces cache memory having other configurations, including for instructions and data and instructions. As another example, the embodiments are described to support a copy-back policy. However, it should be understood that the invention embraces other write policies, including write-through. As yet another example, the embodiments are described to enable up to, half of all the elements of each set to be locked, with a granularity of one element. However, it should be understood that the invention embraces the locking of more than half of the elements of each set, as well as selected granularities of other than one element. As a final, non-exhaustive example, the embodiments are described to employ an 8-way set-associative cache memory. However, it should be understood that the invention embraces cache memory that is otherwise organized.

Before proceeding with the detailed description, certain general cache terms are set forth for the sake of clarity, as follows:

Cache block—An amount of information that generally has a fixed number of words as determined by an address range. Each cache block has an associated tag which is stored in the tag array. The cache block responds to the property of spatial locality, engendering the unit for duplicating information from higher level memory for storage in the cache memory. In an n-way set-associative cache memory, each cache block can reside in any of the "n" elements of the set to which the cache block is assigned. In the embodiments described herein, the cache block has sixty four bytes (64 B).

Block status—Status bits associated with a cache block. Status bits include a dirty bit to indicate a modified block and a valid bit to indicate that the cache block is valid. In the embodiments described herein, one dirty bit and one valid bit are used per cache block. Accordingly, each cache block and its associated tag are either entirely valid or invalid, and each is entirely dirty or not.

Copy-back—A write policy in which the processing device writes information to the cache memory, which information is not immediately written to the higher level memory. The copy-back process sets the dirty bit so as to indicate that the cache block is a modified cache block, i.e., the information thereof is not consistent with the associated information of higher level memory. The information of a modified cache block is written (copied back) to the higher level memory when that block is being replaced in the cache memory. In the embodiments described herein, the entire cache block is copied back to the higher level memory.

Data Memory—The physical structure of the cache memory used to store information. The data memory typically comprises a fast, random access memory technology organized in an array. In the embodiments described herein, the data memory has a capacity of sixteen kilobytes (16 KB).

Element—In an n-way set-associative cache memory having "m" sets, each set has "n" elements, with each element enabled to store one cache block and to have one associated tag. When an element is locked, the cache block associated therewith cannot be replaced.

Group—A partition unit of the hierarchical LRU replacement policy. In the hierarchical LRU embodiments described, the 8 elements of each set are partitioned into four groups of two elements each. After a miss respecting a given set in the hierarchical embodiments, the cache block to be replaced is determined by selecting the least recently used group of such set and selecting the least recently used element of such group, whereby the cache block of such element is replaced. When locking applies to the group, preferably only one of the elements is locked and the LRU replacement policy maintains the non-locked element as that storing the replaceable cache block.

Hit—Indicates that certain desired information is resident in the cache memory.

Invalidate—An operation by which the valid bit is modified to indicate the invalidity of a cache block, e.g., typically by clearing the bit to logic 0. Invalidating a cache block effectively removes that block from the cache memory. If only one valid bit is used per block, the entire cache block is invalidated upon resetting the valid bit.

Least recently used replacement policy (or "LRU replacement policy" or "LRU")—A cache memory management arrangement by which information is replaced in the cache memory according to the history of use of the information in the cache memory. The least recently used cache block is sought to be replaced, subject to locking. In the described embodiments, the LRU replacement policy preferably is hierarchical: the 8-way set-associative organization employs a 4-way LRU in coordination with a 2-way LRU. Each set of the cache memory has ten bits associated therewith to support the LRU and, preferably, the bits of the sets together are organized in an LRU administration structure.

Locking—An operation by which selected information in the cache memory is precluded from replacement. In the described embodiments, locking preferably is limited to up to half of the data memory. In the embodiments described herein, locking preferably is limited to up to 4 of the 8 elements of each set in the 8-way set-associative organization, with the locking characterized by (i) a granularity of less then an entire way (e.g., one element/cache block), (ii) a substantially even distribution of locked elements among the sets and (iii) contiguous locking proceeding through lockable ways in a selected order starting from a selected element of a selected way.

Lock range—The linear address range (or ranges) of the computing system declared for locking of cache blocks. In the described embodiments, the lock range is declared by setting two registers: LOCK_ADDRESS and LOCK_SIZE.

Miss—Indicates that certain desired information is not resident in the cache memory.

Modified cache block—A cache block for which the dirty bit is set, as described for copy-back operations, above. The modified cache block contains, relative to the higher level memory, the current version of the cache block.

Set—A unit in a set-associative cache memory. Each set has associated elements of a fixed number and, in turn, the tags thereof. In this organization, the associated tags of a set are compared concurrently to determine a cache hit or miss in the set as to operations seeking access to the cache memory.

Set-associative—Cache memory is associative in that it stores data representative of the address associated with information, as well as the information itself. Set-associative refers to an organization wherein the information and its address are stored in the cache memory only in a respective, restricted portion of the cache memory, which portion is the set. After being mapped to the associated set, the information is stored in any element of that set. If the number of elements in a set is "n", the cache memory is generally known as "n-way set-associative". In the embodiments described herein, the cache memory is 8-way set-associative, having 32 sets of 8 elements each, wherein each element can store a cache block. The locking technology of the herein described embodiments modifies set-associative operation of the embodiments in that, after mapping to a set, information to be locked is stored in one or more selected elements of the set.

Tag—Used to identify whether or not a cache block is resident in the cache memory. The tag is an address offset that, together with the cache block's size and information relating to the set-associativity of the cache memory, maps the cache block to its address in the higher level memory. When the processing device seeks access to information, the address of the information is compared with the tags stored in tag memory: if one of the tags corresponds to the address of the information, there is a hit; otherwise, there is a miss. In an n-way set-associative cache memory, that comparison is conducted concurrently for all tags associated with the "n" elements of the applicable set, the applicable set also being determined from that address.

Tag memory—The physical structure of the cache memory used to store the tags of the cache blocks, such storage correlating to the storage of the cache blocks in the memory array. The valid bits preferably are also stored in the tag memory in association with the respective tags. The tag memory typically comprises a fast, random access memory technology organized in an array.

Way—In an n-way set-associative cache memory, the ways are "n" in number and each way comprises "m" elements where "m" is the number of sets.

Write allocate (or "allocate-on-write")—For a set-associative cache memory, a miss can arise in association with a write access to the cache memory. In that event, an element is allocated for writing the cache block implicated by the write access from higher level memory to the cache memory. (In a non-write allocate, the write is performed only in higher level memory.)

Write through—A write access from the processing device to the higher level memory. In the event of a cache hit, the write access also is to the cache memory. This is an alternative to copy-back.

General cache memory terms having been set forth above, the detailed description now proceeds with respect to the Figures.

FIG. 1 illustrates a computing system 10, according to the present invention. The computing system 10 includes (i) a processing device 12, (ii) software 13 and (iii) a memory system 14, the memory system comprising lock ordering resources 15, cache memory 16 and higher level memory 18. The processing device 12 comprises any structure associated with the processing of information compatible with software and memory devices. As such, the processing device 12 can comprise, without being exhaustive, a central processing unit (CPU), or a digital signal processor (DSP), or a combination device (DSP/CPU). The processing device can be implemented using a microprocessor, a micro-controller, groups of the same, or otherwise.

The software 13 comprises application programs, compilers and other software tools, operating systems, and other software, as well as combinations thereof, for realizing the operation of the computing system 10, generally, and of the locking-replacement technology hereof, specifically. For example, preferably an operating system or other memory management software provides for coherency between the cache memory 16 and the higher level memory 18. Moreover, preferably a compiler or other software 13 provides for loading in the higher level memory 18 of information that is to be locked, such loading to support the operation of the lock ordering resources 15. As to this latter function, software 13 is preferred over a programmer to set the lock range in the higher level memory 18, as well as to load the cache blocks therein. While the programmer of an application may declare the lock range and accomplish the loading manually, the programmer typically will instruct the applicable software 13, by variable, the data which is critical and, therefore, is subject to locking.

The lock ordering resources 15 provides for proper loading, and access, of information into the cache memory 16, including coordination with the structure implementing the LRU replacement policy. The lock ordering resources 15 preferably provide for locking characterized by: (i) a granularity of less than an entire way (e.g., locking by one element/cache block); and (ii) a selected contiguity of element locking proceeding through the selected ways of the data memory, element-by-element, in a selected order starting from the base (or some other selected element of a selected way). The contiguity of element locking reflects that the cache blocks to be locked preferably are organized (e.g., through the operation of the operating system or other memory manager) in the higher memory level 18 in a selected address range or ranges. One advantage of this arrangement is the substantially even distribution of locked elements among the sets so that each set is to be disposed to remain available for un-locked operations.

The higher level memory 18 comprises, in the aggregate, the memory structures of the computing system 10 other than the cache memory 16. The higher level memory 18 includes, for example, main memory and more permanent storage, as well as other caching structures interposed between the cache memory 16 and the main memory. The higher level memory 18 typically is not resident in the processing device's integrated circuit or packaging. It is to be recognized, however, that portions (and in some cases, all) higher level memory 18 may be integrated with the processing device 12, in accordance with the engineering demands of the computing system 10. In any case, preferably higher level memory 18 is provided in some form so that, relative to the cache memory 16, a memory level exists that is less closely coupled to the processing device 12 and that stores information for duplication in the cache memory 16.

The cache memory 16 is enabled to lock critical information using a selected, optimally-sized granularity while also enforcing the principle of locality in the replacement policy applicable to unlocked information, as described herein. The cache memory 16 typically resides in the processing device's integrated circuit or packaging, but may be otherwise disposed without departing from the principles of this invention. In any case and subject to modified cache blocks, the cache memory 16 contains copies of information stored in the higher level memory 18. It is to be recognized that one or more levels of memory can be interposed between the cache memory 16 and the processing device 12. In that regard, the cache memory 16 is identified by the structure and functions set forth herein, rather than by any labels used in any actual system, apparatus or method.

To read and write information, the memory system 14 is coupled to the processing device 12 via a processing bus 20 and the cache memory 16 is coupled to the higher level memory 18 via a memory bus 22. Each of the buses 20, 22 provides for communication of any or all of addresses, information and control signals among the coupled components. The information traffic on the buses 20, 22 preferably is in bursts of one cache block. For example, when a cache miss occurs respecting a particular word, the entire cache block containing the word preferably is fetched into the cache memory 16. Notwithstanding the illustrated couplings, it is to be recognized that other connections, including interposed structures can be used.

The computing system 10 generally also comprises peripherals 24. Although any one or more peripherals may be provided or omitted, in any combination, without departing from the principles of the invention, the peripherals 24 typically comprise various input/output (I/O) devices, including displays, keyboards, pointing devices, printers and other data acquisition and signal output devices.

Figure 2:
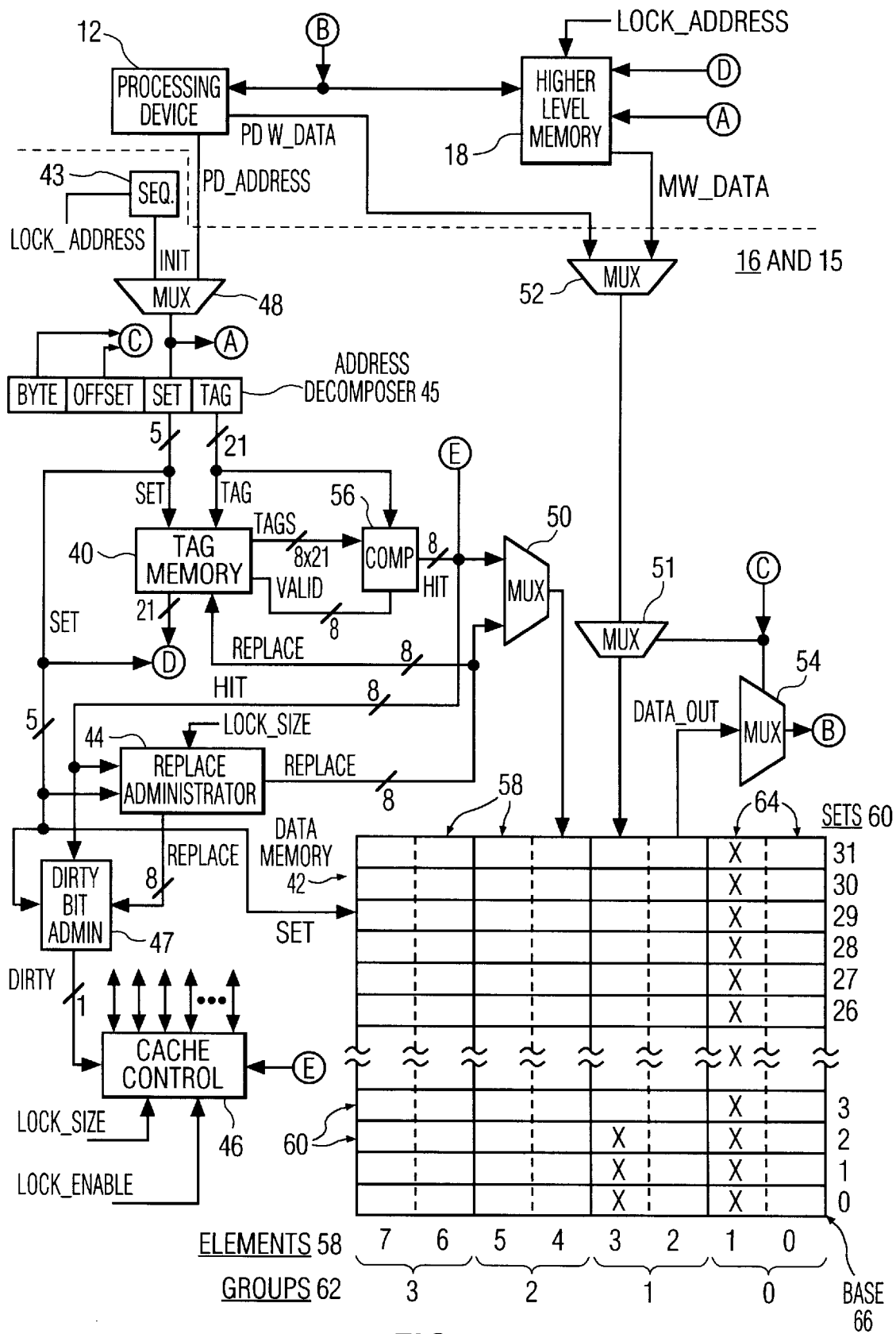
FIG. 2 illustrates a cache memory with lock ordering resources accordingly to the present invention.

FIG. 2 illustrates an embodiment of integrated lock ordering resources 15 and cache memory 16, accordingly to the present invention. This embodiment, shown together with the processing device 12 and the higher level memory 18, comprises a tag memory 40, a data memory 42, a sequencer 43, a replace administrator 44, an address decomposer 45, a cache control 46 and a dirty bit administrator 47. This embodiment also comprises logic, including multiplexors 48, 50, 51, 52 and 54, and a comparator 56.

The tag memory 40 is coupled to the processing device 12 via the address decomposer 45 and the multiplexor 48. The multiplexor 48 selects between the address signal (PD_ADDRESS) from the processing device 12 and the INIT address signal from sequencer 43. The multiplexor 48 selects between these signals based on control signals applied from the cache control 46. The INIT signal is selected in the initialization of locking, as described below. The PD_ADDRESS signal is selected when operations implicate a cache memory access by the processing device 12. In either selection, the address decomposer 45 partitions the selected address into component fields for application to the various elements of the cache memory 16.

In this embodiment and responsive to the organization of the cache memory 16 described, the address signals preferably have the following fields: (i) a 21 bit tag field, (ii) a 5 bit set field, (iii) a 4 bit word field, and (iv) a 2 bit byte field. The 32 bits correlate to the preferred, linear address space of the computing system 10. The 5-bit set field is used to select among the 32 sets of the cache memory 16. The 21-bit tag field selects among the 8 cache blocks of each set. The 4-bit word field selects among the 16 words of each block. The 2-bit byte field selects among the 4 bytes of each word.

The address decomposer 45 applies to the tag memory 40 the set field of the address signal selected by the multiplexor 48. Responsive thereto, the tag memory 40 outputs the eight tags and valid bits, such tags and bits being associated with the identified set 60 (one tag and valid bit for each cache block of the set). The eight tags are applied to the comparator 56 together with the tag field of the partitioned address. Subject to the associated valid bit indicating valid data, a hit occurs if any of the eight tags matches the tag field. If there is a miss, the sought cache block is either not present in the cache memory 16 or, if present, is invalid.

The comparator 56 outputs an eight bit hit signal, HIT. In the event of a miss, the hit signal comprises eight logic 0's. In the event of a hit, one of the eight bits is set to a logic 1. In any event, the hit signal is applied to the replace administrator 44, so that the administrator 44 can update the LRU replacement policy data. To do so for the applicable set, the set field is also applied to the replace administrator 44.

The hit signal is also applied to the multiplexor 50. Also applied to multiplexor 50 is the replacement vector, REPLACE, generated by the replace administrator 44. The multiplexor 50 selects between these applied signals based on control signals applied from the cache control 46, the control signals responding to the operation being performed.

In the event of a memory access relating to receipt of the PD_ADDRESS signal, the hit signal is applied to the data memory 42 via multiplexer 50. This selects the hit block of the applicable set. The applicable set is selected by application of the set field to the data memory 42. If the memory access is a read operation, the data memory outputs a data signal, DATA_OUT, responsive to these applied signals. The data signal comprises the cache block of the hit. The data signal is applied to the multiplexor 54, as controlled by the byte and offset fields partitioned by the address decomposer 45, so that either the entire cache block, a word or a byte/half-byte is selected for output from the cache memory 16. The selected portion of the data signal is applied to the processing device 12.

If the memory access is a write operation, the data memory 42 will receive write data from the processing device 12 via multiplexors 52 and 51. Multiplexor 52 selects between the write data of signal PDW_DATA from the processing device 12 and the write data of signal MW_DATA from the higher level memory 18: the former signal is associated with a write access, while the latter signal is associated with duplicating information from the higher level memory 18 into the cache memory 16, including replacements. The multiplexor 52 selects between these applied signals based on control signals applied from the cache control 46, the control signals corresponding to the operation being performed.

In the write access operation, the multiplexor 51 preferably is controlled by the byte and offset fields partitioned by the address decomposer 45, so that either the entire cache block, a word or a byte/half-byte is selected for modification in the cache memory 16. The cache block to be modified is indicated by the set field and the hit signal applied to the data memory 42. In that indicated cache block, the selected words/bytes/half-bytes are modified to reflect the PDW_DATA signal.

As previously stated, the cache memory 16 preferably implements a copy-back policy, such that the write access is not accompanied immediately by a write to the higher level memory 18. Accordingly, the dirty bit administrator 47 is updated to indicate that the accessed cache block has become a modified cache block. The dirty bit administrator 47 is updated based on (i) application of the set field from the address decomposer 45 and the hit signal from the comparator 56 and (ii) control signals applied from the cache control 46, the control signals indicating a write access operation. The dirty bit administrator 47 typically comprises a fast, random access memory technology organized in an array.

In the event of a cache miss in a memory access operation, information is written to the cache memory 16 from the higher level memory 18. This operation preferably comprises a write of an entire cache block and, generally, implicates replacement of a cache block already present in the cache memory 16. Accordingly, the replace administrator 44 is exercised. (Because this operation is triggered by a cache miss associated either with a read access or a write access and is substantially the same for both such accesses, the operation is described only with respect to a read miss.)

As previously stated, the PD_ADDRESS address signal identifies the cache block of the access operation. With a miss, the cache block is determined to be absent from the cache memory 16. Accordingly, the address of the absent cache block is applied to the higher memory level (at "A") so as to read that block for writing to the cache memory 16. Although the address is applied, as shown, after the multiplexor 48, it is recognized that the address can be otherwise applied, including, without exhaustion, from the decomposer 45 or directly from the processing device 12, all without departing from the principles of the invention.

In the miss, the hit signal HIT comprises a string of eight logical 0s. The hit signal is applied to the replace administrator 44. The replace administrator 44 preferably administers a LRU replacement policy, which policy is modified to provide locking of selected cache blocks such that replacement of the locked blocks is precluded.

Responsive to the hit signal and the set field, and subject to control signals from the cache controller 46, the replace administrator 44 generates the REPLACE vector. The REPLACE vector is 8 bits wide, so as to indicate which of the cache blocks is least recently used and, therefore, selected to be replaced with a replacing cache block from the higher level memory 18. Because replacement is of both a tag and its associated cache block, the REPLACE vector is applied to both the tag memory 40 and the data memory 42. In applying the vector to the tag memory 40, together with the set field, a location is indicated in the tag memory 40 that corresponds to the cache block being replaced in the implicated set 60. To that location is written the tag field of the replacing cache block, updating the tag memory 40 for future cache operations.

The REPLACE vector is applied to the data memory 42 via the multiplexor 50, the multiplexor selecting the vector based on control signals applied from the cache control 46. So applied to the data memory 42, together with the set field, the write data from the higher level memory 18 is written to the applicable element 58. The write data is received from the higher level memory 18 via multiplexors 52 and 51, the multiplexors being controlled by control signals applied from the cache control 46, the control signals corresponding to the write operation being performed.

Prior to writing the replacing cache block to the cache memory 16, the status of the dirty bit of the replaced cache block is investigated. The dirty bit of such block is read from the dirty bit administrator 47 by applying thereto both the set field the and the REPLACE vector. The dirty bit signal DIRTY, so read, is applied to the cache control 46. If the replaced cache block is dirty, the cache control 46 initiates a copy-back of the modified cache block to the higher level memory 18. After the modified cache block is copied back, the dirty bit is reset and the replacement operation goes to completion.

In the copy-back operation, the data memory outputs a data signal, DATA_OUT, responsive to the set field and the REPLACE vector. The DATA_OUT signal comprises the modified cache block. The DATA_OUT signal is applied to the multiplexor 54. As controlled by the byte and offset fields partitioned by the address decomposer 45, the entire modified cache block preferably is output from the cache memory 16 for writing to the higher level memory 18. The modified cache block is written to the higher level memory 18 at the address indicated by the combination of the set field and the tag of the modified cache block. The set field is implied from the address of the cache miss. The tag is obtained by application of the REPLACE vector to the tag memory 40. The address is applied to the higher level memory (at "D").

The data memory 42 is illustrated in FIG. 2 as 8-way set associative, with the elements 58 of each set 60 partitioned among four groups 62. There are two elements 58 assigned to each group 62. There are eight ways 64.

Figure 6:
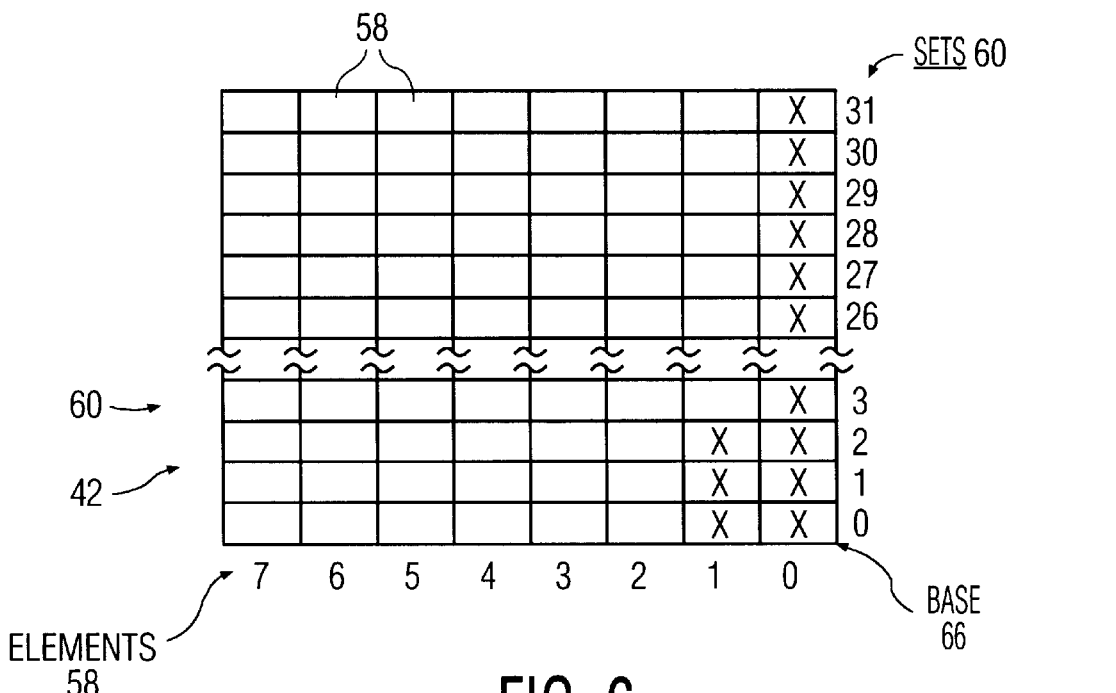
FIG. 6 illustrates an embodiment of an 8-way non-hierarchical LRU administration, according to the present invention.

Notwithstanding this illustration, it should be understood that the data memory 42 may be otherwise organized without departing from the principle of the invention. For example, as shown in FIG. 6, the data memory 42 can be organized as set associative without partitioning into groups. In particular, the data memory 42 can be 8-way set associative such that there are eight ways 64 per set 60.

In both FIGS. 2 and 6, the data memory 42 is illustrated having 35 locked elements (an "X" in an element indicates locking). As illustrated, the elements 58 preferably are locked starting at the base 66 of the data memory 42. This locking arrangement applies when the cache memory's address range is aligned in the address space of the computing system 10, and the lock range is a single, linear address range aligned with the cache memory's address range—the locked cache blocks begin at an address that corresponds to a multiple of the cache memory's capacity (e.g., they begin at a cache memory boundary). Notwithstanding this preference, it should be recognized that the locking can start at a selected element 58 (and, if partitioned, of a selected group 62) that is offset from the base 66, without departing from the principles of the invention.

The locking preferably is limited to elements of selected ways 64. As illustrated with respect to FIG. 2, locking applies to the elements of the odd-numbered way of each 2-way group 64. One advantage of this locking arrangement is that a replaceable element is preserved in each group of each set. Accordingly, even if all groups of each set have locked elements, the LRU selects among the remaining 4 un-locked elements in each group. In that case, the 8-way hierarchical LRU is reduced to a 4-way LRU.

Notwithstanding the illustrated locking arrangement, it should be understood that (i) in groups having two ways, the elements of the even-numbered way can be selected for locking in place of the odd-numbered way and (ii) if the number of ways per group departs from two, the number of ways in which elements can be locked can be other than one. As an example, if the number of ways per group is 16, the number of ways per group for which elements are lockable can be any number from 1 to 16. However, in that case, it is preferred that not all ways of any group be subject to locking. In that regard, it is also preferred that no more than half the ways of any group be subject to locking so that, in a group organization, the replacement policy reserves an element to replace in each way when locking is enabled. Moreover, in all organizations (partitioned in groups, or otherwise), it is yet preferred that no more than half the ways of the data memory 42 be subject to locking and that no set be subject to locking across all its elements.

As shown in FIGS. 2 and 6, contiguity of element locking preferably is implemented in selected, entire ways, even though granularity preferably is sub-way (e.g., see the odd-numbered ways of FIG. 2 and all ways of FIG. 6). It is understood, however, that contiguity can be implemented other than in entire ways, without departing from the principles of the invention. That is, it may be desirable to select less than all elements of the selected ways. As an example, it may be desirable to make available only higher number elements of each selected way (e.g., elements of sets 28–31). As another example, it may be desirable to make available a central number of elements (e.g., elements of sets 8–15). As to any contiguity arrangement, the selected ways can be sequential (e.g., ways 0–7 in FIG. 6) or not (e.g., ways 1, 3, 5 and 7 in FIG. 2), without departing from the principles of the invention. In any case, as previously stated, locking preferably is characterized by: (i) a granularity of less than an entire way 64 (e.g., locking by one element/cache block) and (ii) a selected contiguity of element locking proceeding through the selected ways 64 of the data memory 42, element-by-element, in a selected order starting from the base 66 (or some other selected element 58 of a selected way 64).

Figure 3:
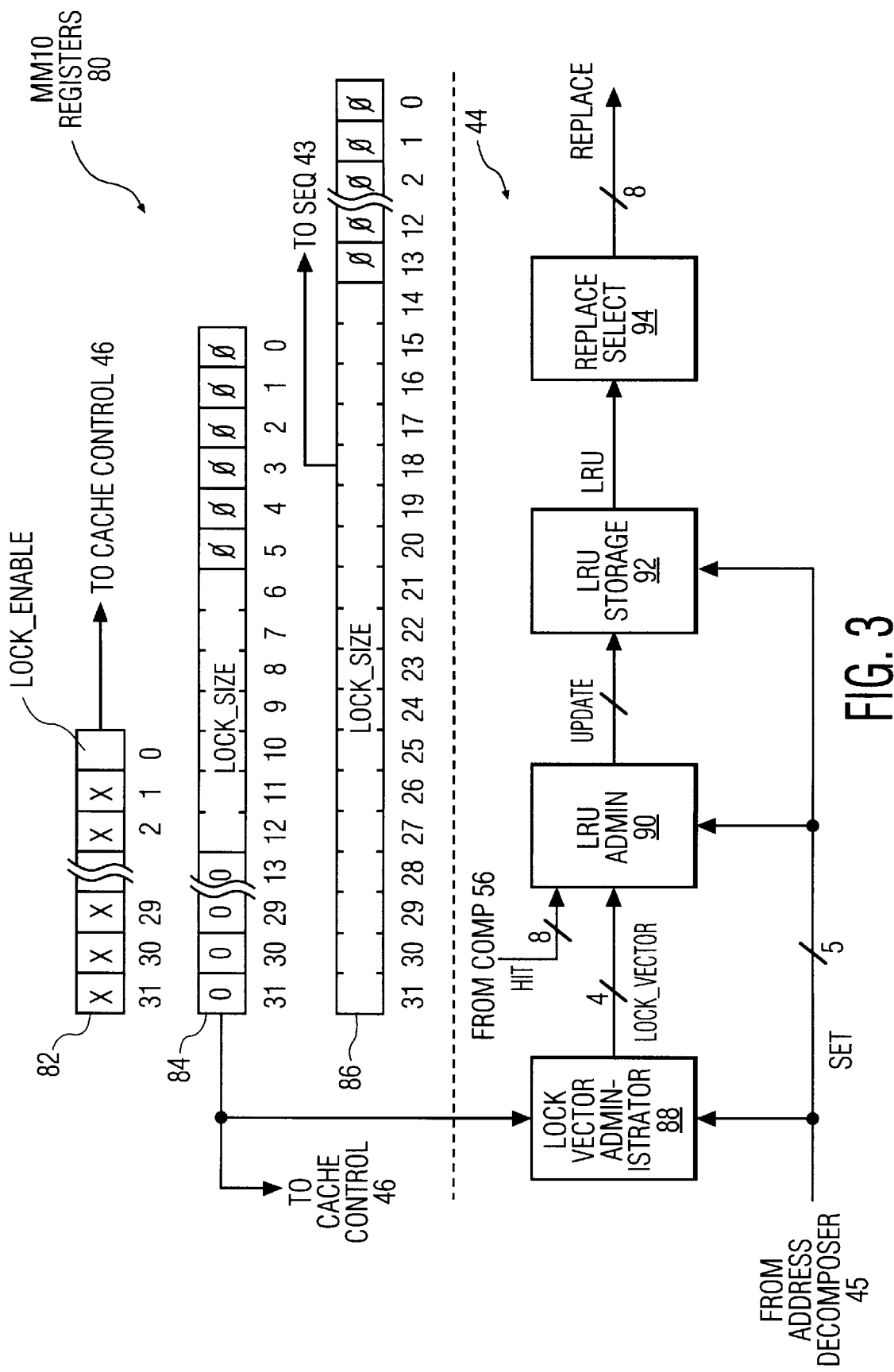
FIG. 3 illustrates, in additional detail, a replacement administrator of the cache memory of FIG. 2.

Turning to FIG. 3, an embodiment of a replace administrator 44 is illustrated, together with memory mapped I/O (MMIO) registers 80 used to initialize and re-initialize the locking arrangement. The memory mapped I/O (MMIO) registers 80 include a LOCK_CONTROL register 82, a LOCK_SIZE register 84 and a LOCK_ADDRESS register 86. The LOCK_CONTROL register 82 contains the LOCK_ENABLE bit which is applied to the cache control 46 to inform the cache control's operations respecting the locking arrangement. The LOCK_SIZE register 84 sets the size of the lock range, this signal being applied to the lock vector administrator 88 and to the cache control 46. In this register 84, as illustrated, the bits 31:13 and 5:0 are set to logic zero, and the size of the lock range is set by bits 12:6. This illustrates both that the maximum size of the lock range is 8 KB bits ($2^{13}$), i.e., half the cache size, and that the granularity is 64 KB ($2^6$), i.e., the size of one cache block. The LOCK_ADDRESS register 86 sets the low address of the lock range. In this register, as illustrated, the bits 13:0 are set to logic 0 such that each low address is aligned on a cache size boundary ($2^{14}$=16 KB).

Although the size and low address are illustrated as described above, it is recognized that these characteristics can be otherwise selected without departing from the principles of the invention. For example, one or more registers can be designated to hold the high and low addresses of the lock range, or to hold the high address and the size of the lock range, or otherwise.

The replace administrator 44 comprises a lock vector administrator 88, an LRU administrator 90, an LRU storage 92, and a replace select 94. While the LOCK_ENABLE bit is enabling locking, the lock vector administrator 88 determines which elements 58 of each set 60 are in the lock range. This determination is represented in the LOCK_VECTOR signal generated by the lock vector administrator 88. Based on application of the LOCK_VECTOR signal, the hit signal and the set field, the LRU administrator 90 provides for updating the LRU information for the set, which update is represented in the UPDATE signal generated by the LRU administrator and applied to the LRU storage 92. The LRU storage 92 stores the LRU information for the entire cache memory 16 and, responsive to application of the UPDATE signal and the set field, updates the information set by set. The LRU storage 92 generates an LRU signal which is applied to the replace select 94. The replace select 94, based on the LRU signal, generates the REPLACE vector. The application of the REPLACE vector is described above with respect to FIG. 2.

The lock vector administrator 88 generates the LOCK_VECTOR signal based on the contents of the LOCK_SIZE register and the set field. The generation of the LOCK_VECTOR signal comports with the non-zeroed bits of the LOCK_SIZE register corresponding to the count of locked elements 58. For example, the seven bits [12:6] provide for up to 128 (i.e., $2^7$) locked elements, or one-half of the 256 total elements of the memory 42. (This correspondence is also recognized to follow from the organization of the cache memory 16: in setting the available bits of the LOCK_SIZE register, only one half of the data memory 42 can be made available for locking, at a granularity of one cache block.) Moreover, the generation of the LOCK_VECTOR signal comports with the locked elements 58 being organized in a known manner. For example, the locked elements preferably are contiguously locked, starting from the base 66 (at set 0, element 1) and proceeding element-by-element through each odd-numbered way 64 from set 0 through set 31, before locking any elements of the next odd-numbered way. As shown in FIG. 2, the way 64 comprising elements "1" is completely locked from set "0" through set "31", and the way 64 comprising elements "3" is partially locked from set "0" through set "2".

Under the described organization and with the inputs described, the LOCK_VECTOR signal is determined for any and all sets 60. This determination may be implemented in various ways, including using any hardware and/or software that corresponds to the following logic:

```
input SET; // set field from the PD_ADDRESS
input [12:6] LOCK_SIZE; // total number of locked cache blocks
input LOCK_ENABLE; // lock mode activated
output [3:0] LOCK_VECTOR; // declares LOCK_VECTOR
assign LOCK_LAST = LOCK_SIZE [10:6] > SET;
cases
    3'b0_xx: LOCK_VECTOR = 4'b0; // LOCK_ENABLE = 0 >> no locking
    3'b1_00: LOCK_VECTOR = (3'b0, LOCK_LAST); // locking edge in grp 0
    3'b1_01: LOCK_VECTOR = (2'b0, LOCK_LAST, 1'b1);//grp 0 filled, edge in grp 1
    3'b1_10: LOCK_VECTOR = (1'b0, LOCK_LAST, 2'b11);//grps 0/1 filled, edge in grp 2
    3'b1_11: LOCK_VECTOR = {LOCK_LAST, 3'b111);//grps 0/1/2 filled, edge in grp 3
end
```

In this logic representation, LOCK_VECTOR is declared to have 4 bits. The 4 bits correspond to the 4 groups and, when a bit is logic 1, the odd-numbered element of the corresponding group is locked. Moreover, the variable LOCK_LAST is determined, by formula, to have a value of logic 1 whenever the value of the least significant five bits of LOCK-SIZE [10:6] exceeds the value of the set field, SET. Otherwise, LOCK_LAST's value is logic 0. With LOCK_LAST so determined, the logic turns to various cases to determine the LOCK_VECTOR.

In the first case, the LOCK_VECTOR is 0000 (groups 3,2,1,0) because the LOCK_ENABLE bit ("b0") has disabled locking. In the second case, denoted by "3'b1_00:", (i) the "b1" indicates that locking is enabled and (ii) the "00" correspond to the most significant bits of LOCK_SIZE [12:11] so that no more than the elements "1" of way 0 can be locked (e.g., the locking edge is in group 0). Accordingly, the LOCK_VECTOR is "000" for groups 3,2 and 1 and is LOCK_LAST for group 0. Similarly, in the third case, denoted by "3'b1_01", (i) the "b1" indicates that locking is enabled and (ii) the "01" provide that all 32 elements "1" of group 0 are locked and that no more than the elements "3" of way 1 can be locked (e.g., the locking edge is in group 1). Accordingly, the LOCK_VECTOR is "00" for groups 3 and 2, and is LOCK_LAST for group 1 and is "1" for group 0. The other cases are similarly analyzed.

In this description, the LOCK_VECTOR signal's use of four bits reflects (i) the partitioning of elements in four groups responsive to a preferred LRU replacement policy and (ii) the selection to restrict locking to only the ways 64 associated with the odd-numbered elements 58 of each group 62. When locking is limited to selected ways 64 of groups 62, it generally is redundant to include in the LOCK_VECTOR signal any bits corresponding to ways 64 of the non-selected ways 64. Nevertheless, it is to be recognized that the structure of the LOCK_VECTOR signal can have more than four bits and can be otherwise implemented, without departing from the principles of the invention. The number of bits depends on various factors, including, for example, whether ways are partitioned into groups and, if so, the number of ways per group that are enabled for locking.

The logic set forth above relies on (i) the lock range being aligned so that locking begins with the base 66, i.e. element 1 of set 0 and (ii) having selected ways available for locking, i.e., the four ways 1, 3, 5 and 7. If the lock range were otherwise aligned or the available ways otherwise selected, it is understood that the logic is subject to adjustment. For example, in the alignment case, the contents of the LOCK_ADDRESS register preferably are introduced in the logic to identify the selected element of the selected way 64 at which locking commences.

In addition, the logic set forth above relies on contiguity implemented in entire ways. If the contiguity is implemented otherwise, the logic is subject to adjustment. For example, assuming that both the number of elements available and the beginning element (or ending element) is common across the selected ways, these data points preferably are reflected in the logic.

The LOCK_VECTOR signal, so generated, is applied to the LRU administrator 90, so as to preclude the locked elements 58 of the applicable set 60 from being designated as available for replacement by the LRU administrator 90, LRU storage 92 and replace select 94.

A preferred LRU replacement policy in the described 8-way set-associative cache memory is a hierarchical LRU: a 4-way combined with a 2-way. The 4-way LRU partitions the 8 elements of each set into four groups so as to administer an LRU among the four groups. The 2-way LRU administers an LRU among the two elements of each group. Broadly stated, the so-implemented hierarchical LRU determines a replacement victim after a miss by selecting the least recently used group of the implicated set and by selecting the least recently used element of such group, whereby the cache block of such element is replaced.

Figure 4:
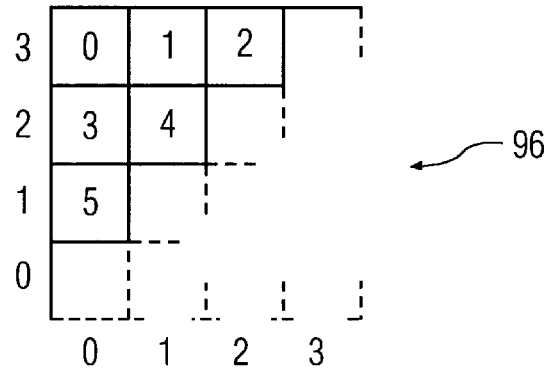
FIG. 4 illustrates an embodiment of a 4-way LRU administration implementation in a cache memory, according to the present invention.

To implement the 4-way LRU, the LRU administrator 90 preferably uses an upper-left triangular of a 4×4 matrix ("R") 96 of one-bit entries, omitting the diagonal, as illustrated in FIG. 4. After access of a group "p", the LRU administrator 90 updates the 4-way LRU for the group's set 60 by (i) setting the matrix entries corresponding to row "p"and (ii) clearing the matrix entries corresponding to column "p": R[row, column]: R[p, 0 . . . 3]←1 and R[0 . . . 3, p]←0. This administration sets group "p"as the most recently used (MRU) group. By comparison, the LRU group "q"corresponds to the row/column combination wherein the row "q"entries are all cleared and the column "q"entries are all set: R[row, column]: R[q, 0 . . . 3]←0 and R[0 . . . 3, q]←1.

To implement the 2-way LRU, the LRU administrator 90 uses one bit for each group 62 in a set 60. In doing so, the LRU administrator 90 preferably follows a pre-selected correlation between the value of each group's bit and the LRU element indicated thereby. In the embodiments described, the LRU bit is logic 1 if the odd-numbered element is LRU and the LRU is logic 0 if the even-numbered element is LRU.

Figure 5:
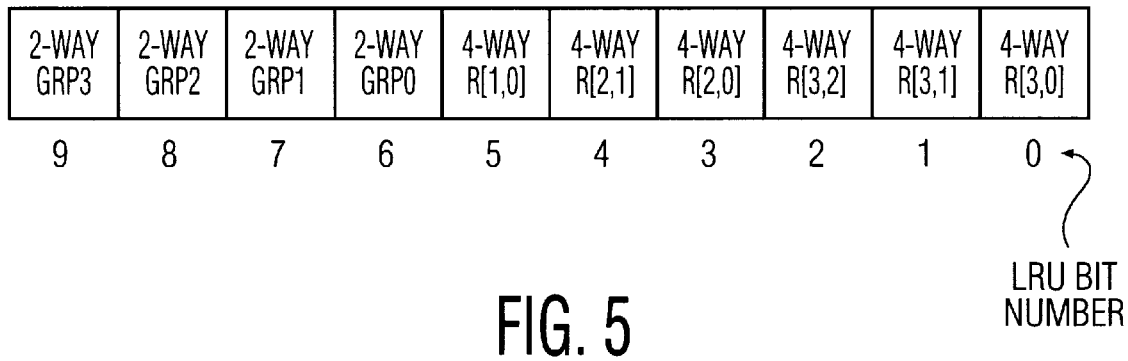
FIG. 5 illustrates an embodiment of an 8-way hierarchical LRU administration, implemented as a 4-way and 2-way LRU, according to the present invention.

Under this hierarchy, the LRU administrator 90 can update, and the LRU storage 92 maintains, ten bits for each set 60. The 2-way hierarchy contributes 4 bits per set. The 4-way hierarchy contributes six bits per set. In the 4-way hierarchy, the triangular matrix's number of entries reflects that any n-way LRU has an n×n administration matrix with an upper-left triangle of entries numbering $n*(n-1)/2$. In the embodiment described, the LRU's ten bits preferably are defined, per set, as illustrated in FIG. 5 (wherein "GRPx" indicates the group number for the 2-way LRU and "R[x,y]" indicates the entry from the triangular matrix 96).

In operation with locking, the LOCK_VECTOR signal indicates which groups have a locked element such that the LRU administrator 90 suspends the 2-way LRU for such groups. The 4-way LRU is unaffected. The 4-way is unaffected due to the locking arrangement's restriction as to the number of lockable elements per group: (i) because at least one element per group remains unlocked, each group has a replacement candidate and (ii) the 4-way LRU administers the LRU among the groups.

The suspension of the 2-way LRU's operation is effected by precluding the update of the 2-way LRU information for the group having a locked element. In the embodiments described, this approach responds to (a) restricting locking to the odd-numbered way 64 for each group 62 (e.g., ways "1", "3", "5" and "7", as illustrated in FIG. 2) and (b) setting the LRU bit to logic 1 if the odd-numbered element is LRU and setting the LRU bit to logic 0 if the even-numbered element is LRU. Under these conditions, when a group "k" is locked, the LRU is set to 0 so as to point to the even-numbered, unlocked element, which unlocked element's cache block thereby remains available for replacement. If the unlocked element is subsequently accessed, the 2-way LRU bit nevertheless remains unchanged. Moreover, if a replacement operation is subsequently directed to the group "k" by the 4-way LRU, the LRU storage 92 will continue to identify the even-numbered, unlocked element as that for replacement, even after that element's cache block is replaced.

In the hierarchical embodiments of FIG. 2, the LRU administrator's UPDATE signal updates the LRU information in the LRU storage 92 as to the set 60 of the set field. The update is conducted as to the group 62 of the cache hit. By inspection of FIG. 4 together with the update logic set forth above, the 4-way LRU updates three bits. Similarly, the 2-way LRU updates one bit and, in the case of a locked group, can be implemented so as to update no bit.

This operation may be implemented in various ways, including using any hardware and/or software that corresponds to the following exemplary logic:

```
cases {LOCK_VECTOR, HIT}
    12'bxxx0_00000001: // LOCK_VECTOR = no locking; Hit at element 0, group 0
        clear [0], clear [3], clear [5] // Update 4-way LRU for group 0
        set [6] // Update 2-way LRU for group 0: element 1 is LRU by setting bit 6 to logic 1
```

-continued

```
12'bxxx1_00000001: // LOCK_VECTOR = group 0 locked; Hit at element 0, group 0
   clear [0], clear [3], clear [5] // Update 4-way LRU for group 0
   //No 2-way update -- element 0 remains LRU (bit 6 is logic 0)
12'bxxxx_00000010://LOCK_VECTOR = group 0 locked or not; Hit at element 1, grp 0
   clear [0], clear [3], clear [5] // Update 4-way LRU for group 0
   clear [6] // Update 2-way LRU for group 0: element 0 is LRU as bit 6 is logic 0
end
```

The above logic is exemplary of hits in group 0. However, it is recognized that this logic is readily adaptable to hits in other groups, it being noted that bits for updating are illustrated in FIGS. 4 and 5. It is also recognized that this logic is readily adaptable to hits in cache memory's having organizations that are not partitioned into groups.

With reference to the above logic, the case where a hit occurs at element 1 illustrates that the logic need not distinguish between circumstances where the group is locked or not locked. In either case, for the reasons previously described, the 2-way LRU identifies element 0 (the even-numbered element of group 0) as the LRU element. To do so, the 2-way LRU clears bit 6 (to logic 0). This "clear" is redundant in the case of locking in group 0, but is present so as to minimize the number of cases.

In the case of non-hierarchical LRU replacement policies, the LRU's operation preferably is suspended as to a set's locked elements, while the LRU's operation is unaffected as to unlocked elements. One process to accomplish this is to conduct a conventional update operation only when an unlocked element is accessed and, after such operation, to conduct additional update operations for each element that is locked, whereby all such update operations are completed prior to any replacement operation. Such additional update operations have the effect of maintaining the locked elements as the most recently used, notwithstanding any access to any unlocked element.

As previously described, when the LOCK_ENABLE bit is logic 1, locking is enabled. In addition, writing a logic 1 to that bit preferably triggers initialization of the locking arrangement. The writing of a logic 1 to that bit preferably also triggers re-initialization even when the bit's prevailing value is logic 1. The writing so triggers the initialization or re-initialization by flagging the cache control 46 to start the corresponding initialization operations. The writing of a logic 0 to the LOCK_ENABLE bit preferably triggers no operations other than an update of the LOCK_VECTOR signal to reflect that all formerly locked cache blocks have become available for replacement.

The initialization operations include the following procedures: (i) invalidate each cache block resident in the cache memory 16 that has an address in the lock range, provided that, if its dirty bit is set, the cache block is first copied back to the higher level memory 18; (ii) invalidate each cache block residing in an element 58 subject to locking within the lock range (such cache blocks not having addresses in the lock range), provided that, if its dirty bit is set, the cache block is first copied back to the higher level memory 18; (iii) for each block in higher level memory 18 that has an address in the lock range, fetch such block into its respective freed, lockable element 58; and (iv) initialize the LRU information, including the LOCK_VECTOR signal, for the implicated sets. These procedures can be accomplished in various ways and in various sequences.

Figure 7:
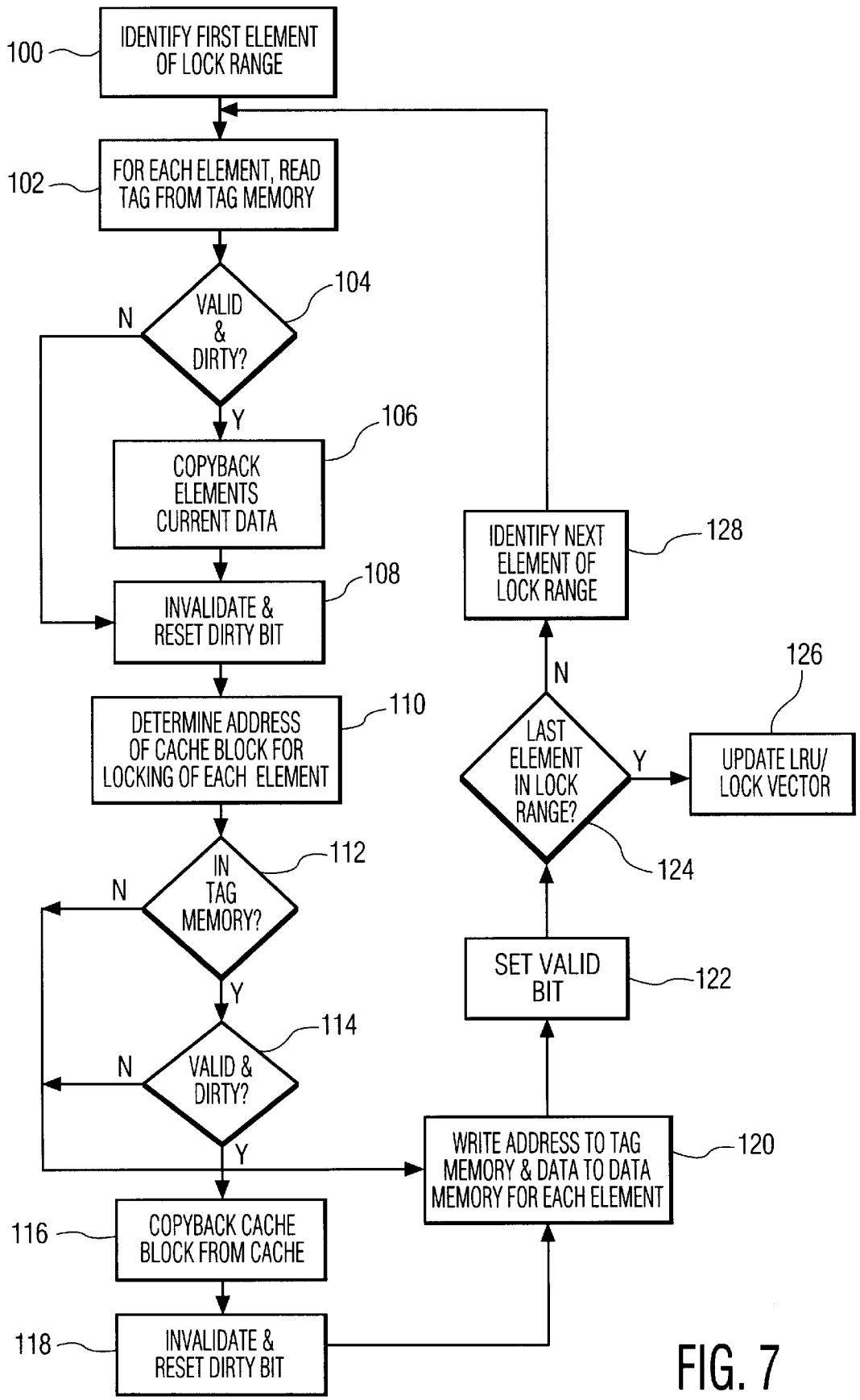
FIG. 7 is a flow-chart showing an embodiment of steps generally associated with initialization of a cache memory, according to the present invention.

In one embodiment, these initialization operations are illustrated in steps 100–128 of FIG. 7. Steps 102–108 correspond to the procedure ("ii" above) designated to free elements 58 of the lock range. Steps 110–118 correspond to procedure ("i" above) designated to invalidate cache blocks that are resident in the cache memory, but not in the lock range. Steps 120–122 correspond to procedure ("iii" above) designated to fetch cache blocks into freed elements 58, for locking in association therewith. Step 126 corresponds to procedure ("iv" above) designated to initialize LRU information.

Steps 100 and 128 provide for sequencing through the lock range. In particularly, in step 100 and 102, the first element of the lock range is identified, and the tag is read from the tag memory. Thereafter it is determined whether the cache block is valid and whether its dirty bit is set, if so, the element's current data (e.g. the cache block) is copied-back to the higher level memory. In either case the cache block is invalidated and the dirty bit is reset. These steps are represented by steps 104–108. In steps 110–118, the addresses of the cache blocks in the locking range is determined and each are checked whether it is in the tag memory, valid and whether the dirty bit is set; if so, the cache block is copiedback into the higher level memory and the cache block is invalidated and the dirty bit is reset, before proceeding to step 120. In 120, the address is written to the tag memory and the data is written to the data memory. In step 122 the valid bit is set. A check is performed in steps 124 and 128 to determine if the last element of the lock range is reached or to identify the next element. If the last element is reached in step 124, the LRU/lock vector is updated in step 126. In FIG. 2, steps 100 and 128 are implemented via the sequencer 43 and the cache control 46. In that regard, these steps proceed by writing the LOCK_ADDRESS signal to the sequencer 43. From that starting address, the sequencer 43 and cache control 46 provide tags of selected contiguity for storage in the tag memory 40, as corresponds to the contiguity of locked elements in the data memory 42 (i.e., proceeding through the selected ways 64 of the data memory 42, element-by-element, in a selected order starting from the base 66 or some other selected element 58 of a selected way 64). That is, the LOCK_ADDRESS signal sets the low address of the lock range from which the sequencer 43 and the cache control 46 produce INIT signals to sequence through the cache block addresses to be loaded into the tag memory 40 and the corresponding cache blocks to be loaded into the data memory 42.

Comporting with steps 110–118, each INIT signal, having a set component and a tag component, is used in inspecting the tag memory 40 for residence anywhere therein of the address of the cache block being fetched. If there is a hit, the cache control 46 conducts appropriate steps, including copy-back operations, all culminating in the cache block's invalidation. Comporting with steps 102–108, the cache control 46 provides for inspection of the contents of the tag memory 40 associated with each of the elements 58 of the lock range. If the block status of such contents indicate that the respective element 58 is valid, dirty data, the cache control 46 conducts copy-back operations, all culminating in the invalidation of the element's current data.

Adding or removing locked cache blocks can be accomplished in various ways, without departing from the principles of this invention. One embodiment provides that both adding and removing blocks follows the sequence: (i) disable cache locking by writing a logic 0 to the LOCK_ENABLE bit; (ii) define a new lock range (e.g., larger or smaller and preferably subject to a granularity of one block) by writing to either or both the LOCK_SIZE register 84 or the LOCK_ADDRESS register 86; and (iii) re-enable cache locking by writing a logic 1 to the LOCK_ENABLE bit. In another embodiment, any cache blocks properly placed in the cache memory are maintained; all other cache blocks being subject to removal (e.g., invalidation) and replacement.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A computer system, comprising:
   a processing device;
   a memory system coupled to the processing device and including
   a higher level memory and a cache memory;
   the higher level memory providing for storage of information;
   the cache memory providing for storage of information in cache blocks duplicated from the higher level memory, and the cache memory comprising elements organized in sets and ways and including a replacement policy, wherein each cache block can reside in any element of a set to which a cache block is assigned; and
   the memory system including lock ordering resources, the lock ordering resources capable of utilizing a granularity of less than an entire way and a selected contiguity of element locking proceeding through selected ways, element-by-element, in a selected order starting from a selected beginning element of one of the selected ways.

2. A computing system as claimed in claim 1, wherein the lock ordering resources are integrated with the cache memory.

3. A computing system as claimed in claim 1, wherein the lock ordering resources includes a loading mechanism for loading, in the higher level memory, information designated for locking in the cache memory.

4. A computing system as claimed in claim 3, wherein the loading mechanism comprises software executed by the processing device.

5. A computing system as claimed in claim 1, wherein the cache memory comprises a tag memory and a data memory, and the lock ordering resources comprise a sequencer, a first storage device and a cache control, the first storage device storing data representative of the address of the first cache block subject to locking, the sequencer receiving said address of the first cache block subject to locking and generating a sequence of signals representative of addresses of cache blocks subject to locking, the addresses of the cache blocks subject to locking being stored in the tag memory and the cache blocks subject to locking being stored in the data memory, and the cache control providing elements of the tag and data memories corresponding to the selected contiguity of element locking and the selected order for storage of the addresses and cache blocks subject to locking.

6. A computing system as claimed in claim 5, wherein the lock ordering resources further comprise a second storage device, the second storage device storing data representative of the number of elements for locking of the total elements available for locking in the contiguity of element locking through all of the selected ways, the data stored in the second storage device being applied to the cache control for providing said corresponding elements of the tag and data memories.

7. A computing system as claimed in claim 5, wherein the lock ordering resources further comprise a lock vector administrator and the cache memory further comprises a Least Recently Used (LRU) administrator, the lock vector administrator determining, responsive to a cache memory access of a set, the locked elements of the accessed set, and the LRU administrator, responsive to the locked element determination, being precluded from designating the cache blocks subject to locking associated with the locked elements of the accessed set as available for replacement.

8. A computing system as claimed in claim 7, wherein the lock ordering resources further comprise a second storage device, the second storage device storing data representative of the number of elements for locking of the total elements available for locking in the contiguity of element locking through all of the selected ways, and wherein the lock vector administrator, responsive to the data stored in the second storage device, to the selected contiguity of element locking and to the selected order, generates a locking status signal representative of the locked elements of the accessed set.

9. A computing system as claimed in claim 8, wherein the locking status signal is representative of data restricted to the selected ways.

10. A cache memory, the cache memory providing for storage of information in cache blocks duplicated from a higher level memory, and comprising elements organized in sets and ways and supporting a replacement policy wherein each cache block can reside in any element of a set to which a cache block is assigned, the cache memory comprising:
    a tag memory;
    a data memory; and
    lock ordering resources, the lock ordering resources capable of utilizing a granularity of less than an entire way and a selected contiguity of element locking proceeding through selected ways, element-by-element, in a selected order starting from a selected beginning element of one of the selected ways.

11. A cache memory as claimed in claim 10, wherein the lock ordering resources comprise a sequencer, a first storage device and a cache control, the first storage device storing data representative of an address of a first cache block subject to locking, the sequencer receiving the address of the first cache block subject to locking and generating a sequence of signals representative of addresses of the cache blocks subject to locking, the addresses being stored in the tag memory and the cache blocks subject to locking being stored in the data memory, and the cache control providing elements of the tag and data memories corresponding to the selected contiguity of element locking and the selected order for storage of the addresses and cache blocks subject to locking.

12. A cache memory as claimed in claim 11, wherein the lock ordering resources further comprise a second storage device, the second storage device containing data representative of the number of elements for locking of the total elements available for locking in the contiguity of element locking through all of the selected ways, the data storage in the second storage device, being applied to the cache control for providing the corresponding elements of the tag and data memories.

13. A cache memory as claimed in claim 11, further comprising a Least Recently Used (LRU) administrator and wherein the lock ordering resources further comprise a lock vector administrator, the lock vector administrator determining, responsive to a cache memory access of a set, the locked elements of the accessed set, and the LRU administrator, responsive to said locked element determination, being precluded from designating the cache blocks subject to locking associated with the locked elements of the accessed set as available for replacement.

14. A cache memory as claimed in claim 13, wherein the lock ordering resources further comprise a second storage device, the second storage device storing data representative of the number of elements for locking of the total elements available for locking in the contiguity of element locking through all of the selected ways, and wherein the lock vector administrator, responsive to the data stored in the second storage device, to the selected contiguity of element locking and to the selected order, generates a locking status signal representative of the locked elements of the accessed set.

15. A cache memory as claimed in claim 14, wherein the locking status signal is representative of data restricted to the selected ways.

16. A cache memory as claimed in claim 14, wherein the second storage device is coupled to the cache control, the data stored in the second storage device being applied to the cache control for providing the corresponding elements of the tag and data memories.

17. A cache memory as claimed in claim 11, wherein the number of selected ways less than the total number of ways.

18. A cache memory as claimed in claim 17, wherein the selected ways are restricted to a selected one of the odd-numbered and even-numbered ways.

19. A cache memory as claimed in claim 17, wherein the selected ways are sequential.

20. A cache memory as claimed in claim 17, wherein the total number of ways of the cache memory are organized in groups and the selected ways of each group number less than the total number of ways of that group.

21. In a cache memory providing for storage of information in cache blocks duplicated from a higher level memory, and comprising elements organized in sets and ways, wherein each cache block can reside in any element of a set to which a cache block is assigned, and including a replacement policy, a process for enabling locking of elements, the process comprising the steps of:

selecting a granularity of less than an entire way;

selecting a beginning element for locking;

selecting ways available for locking; and selecting a contiguity of element locking proceeding through the selected ways, element-by-element, in a selected order starting from the selected beginning element of one of the selected ways.

22. A process as claimed in claim 21, further comprising the steps of designating a lock range subject to locking and loading cache blocks from the higher level memory having addresses in the lock range into the contiguity of element locking of the selected ways.

23. A process as claimed in claim 22, wherein the loading step comprises at least one of the steps of:

(i) invalidating each cache block that is resident anywhere in the cache memory and that has an address in the lock range; and (ii) invalidating each cache block that is resident in an element subject to locking.

24. A process as claimed in claim 23, further comprising the steps of checking the dirty bit of each cache block of the cache memory and, where the dirty bit is set, copying back the cache block to the higher level memory.

25. A process as claimed in claim 22, wherein the loading step comprises:

providing data representative of an address of a first cache block subject to locking;

responsive to the representative data, generating a sequence of signals representative of
 addresses of cache blocks subject to locking,
  the addresses being stored in a tag memory and the cache blocks subject to locking being stored in a data memory; and providing, to the process, elements relating to the tag and data memories corresponding to the selected contiguity of element locking and the selected order for storage of the addresses and cache blocks subject to locking.

26. A process as claimed in claim 25, further comprising the step of determining data representative of the number of elements for locking of the total elements available for locking in the contiguity of element locking through all of the selected ways, the representative data being applied for by the process for providing the corresponding elements.

27. A process as claimed in claim 25, further comprising the steps of determining, responsive to a cache memory access of a set, the locked elements of the accessed set, and, responsive to said locked element determination, precluding designation of the cache blocks associated with said locked elements of the recessed set as available for replacement.

28. A process as claimed in claim 27, further comprising determining data representative of the number of elements for locking of the total elements available for locking in the contiguity of element locking through all of the selected ways, and, responsive to the representative data, to the selected contiguity of element locking and to the selected order, generating a locking status signal representative of the locked elements of the accessed set.

29. A process as claimed in claim 28, further comprising generating a locking status signal representative of data restricted to the selected ways.

30. A process as claimed in claim 22, further comprising the step of changing the cache blocks loaded into the cache memory, such change step includes the steps of (i) disabling locking for the entire cache memory; (ii) re-designating the lock range; and (iii) re-enabling locking.

31. A process as claimed in claim 22, further comprising the step of updating replacement policy data, the updating step including determining, responsive to a cache memory access of a set, the locked elements of the accessed set, and, responsive to the locked element determination, precluding designation of the cache blocks associated with the locked elements as available for replacement.

* * * * *